3,317,545
[2-(2,6-DIMETHYLPIPERIDINO)ETHYL]GUANI-
DINES AND INTERMEDIATES

Harry Allen Albrecht, Nutley, John Thomas Plati, Rutherford, and Wilhelm Wenner, Upper Montclair, N.J., assignors to Hoffmann-La Roche Inc., Nutley, N.J., a corporation of New Jersey
No Drawing. Filed Aug. 21, 1963, Ser. No. 303,680
3 Claims. (Cl. 260—293)

This invention relates to novel heterocyclic compounds, methods for preparing them, an novel intermediates useful in their preparation. The compounds to which this invention pertains are dimethylpiperidines bearing a substituent on the hetero nitrogen atom. More particularly, this invention pertains to [2-(2,6-dimethylpiperidino) ethyl]guanidine and non-toxic acid addition salts thereof.

The compound [2-(2,6-dimethylpiperidino)ethyl]guanidine is capable of existing either in the form of a cis isomer or trans isomer. The instant invention comprehends the various stereoisomeric forms, e.g. (+)-trans, (−)-trans, racemate and cis forms.

[2-(2,6-dimethylpiperidino)ethyl]guanidine is basic and forms acid addition salts with inorganic or organic acids. Thus, it forms non-toxic acid addition salts with both pharmaceutically acceptable organic and inorganic acids such as the hydrohalides, e.g. hydrochloride, hydrobromide, hydroiodide, other mineral acid salts such as sulfate, nitrate, phosphate and the like, alkyl- and mono-aryl sulfonates such as ethanesulfonate, toluenesulfonate, benzenesulfonate, or the like, other organic acids such as acetate, tartrate, maleate, citrate, benzoate, salicylate, ascorbate and the like.

The compounds of this invention can be prepared by several diverse methods. In one aspect, 2,6-dimethylpiperidine can be reacted with chloroacetonitrile to form 2,6-dimethylpiperidino-acetonitrile, which in turn can be reduced to 2-(2,6-dimethylpiperidino)ethylamine. This latter compound can then be reacted with either 2-lower alkyl-2-pseudothiourea or 2-lower alkyl-2-pseudourea, which reaction forms the guanidine moiety and thereby yields the desired [2-(2,6-dimethylpiperidino)ethyl]guanidine. This reaction path does not result in any alteration of the initial steric configuration of the starting material. Thus, if cis-2,6-dimethylpiperidine is used as the starting material, the end product will be [cis-2-(2,6-dimethylpiperidino)ethyl]-guanidine; whereas if the initial starting material is trans-2,6-dimethylpiperidino, the end product will be [trans-2-(2,6-dimethylpiperidino)ethyl] guanidine.

The conversion of the starting material to 2,6-dimethylpiperidino-acetonitrile is suitably conducted either without solvent or preferably in an inert organic solvent for the reactants such as, for example, benzene, toluene, ether, and petroleum ether or the like. There is no particular temperature critical to the success of this reaction and it can be conducted at room temperature or above room temperature. Suitably, it is conducted at the reflux temperature of the reaction medium used.

The so-obtained 2,6-dimethylpiperidino-acetonitrile can be reduced to the corresponding [2-(2,6-dimethylpiperidino)ethyl]guanidine either by the use of a reducing agent, such as lithium aluminum hydride, or by hydrogenation in the presence of a hydrogenation catalyst, such as, for example, Raney nickel or Raney cobalt (suitably in the presence of ammonia).

The reaction of the so-obtained 2-(2,6-dimethylpiperidino)ethylamine with the 2-lower alkyl-2-pseudourea or 2-lower alkyl-2-pseudothiourea is suitably effected utilizing an acid addition salt of the S-alkyl-pseudothiourea or O-alkyl-pseudourea. There is no particular temperature critical to the success of this reaction and it can be conducted at room temperature or below or above room temperature. Similarly it can be conducted at atmospheric pressure or at reduced or elevated pressure. The reaction should be carried out in a medium which serves as a solvent for the reactants and any suitable conventional solvent medium can be used for this purpose, for example, the reaction can be conducted in a polar solvent, such as ethylacetate or suitably an aqueous system, e.g. an aqueous alcoholic system or the like aqueous system containing a water miscible solvent.

In yet another embodiment of this invention, the desired [2-(2,6-dimethylpiperidino)ethyl]guanidine can be obtained from 2-(2,6-dimethylpiperidino)ethylamine by reaction with the latter compound with a pyrazole-1-carboxamidine. Suitably, the process comprises reacting 2-(2,6-dimethylpiperidino)ethylamine with an acid addition salt of 3,5-di(lower alkyl)-pyrazole-1-carboxamidine. There is no particular temperature critical to the success of this reaction. Similarly, it can be conducted at atmospheric pressure or at reduced or elevated pressure. The reaction should be carried out in a medium which serves as a solvent for the reactants and any suitable conventional solvent medium can be used for this purpose, for example, the reaction can be conducted in an aqueous system, an aqueous alcoholic system, or the like aqueous system containing a water miscible solvent.

In yet another embodiment of this invention, the desired [2-(2,6-dimethylpiperidino)ethyl]guanidine can be prepared via reacting cyanamide with 2-(2,6-dimethylpiperidino)ethylamine. This reaction can be carried out in the absence of any solvent other than reactants. It is preferable, however, to carry out the reaction in an indifferent non-polar solvent such as toluene, xylene, or the like. Such solvents act as diluents. While it is suitable to react the compound and cyanamide in approximately equal molecular proportions, either reactant can be used in excess. The non-polar inert solvent when added to the reaction partners serves to moderate the reaction when the reaction mixture is heated. The reaction is exothermic, and without solvent, a vigorous reaction will occur. With the reactants suspended in a solvent, it has been found preferable to conduct the reaction at an elevated temperature, e.g. at the reflux temperature of the solvent. Thus, it is suitable to conduct the reaction in the presence of a solvent at a temperature above about 100° C. and up to the reflux temperature of the reaction medium.

[2-(2,6-dimethylpiperidino)ethyl]guanidine (in any of its stereoisomeric forms, or mixtures thereof), and the non-toxic acid addition salts thereof are useful as hypotensives. More particularly, they are especially useful as hypotensives since they are substantially free of unwanted side effects associated with known hypotensive agents, such as catecholamine release, prolonged ganglionic blockade and initial temporary hyptertension. The guanidine compounds of this invention effect an initial weak ganglionic blockade followed by a prolonged postganglionic blocking action. Moreover, they can be administered orally or parenterally with dosage adjusted to individual requirements. Thus, [2-(2,6-dimethylpiperidino)ethyl]guanidine (in any of its stereoisomeric forms, or mixtures thereof), or a non-toxic acid addition salt thereof, can be administered therapeutically, for example, orally or parenterally by incorporating a therapeutic dosage (i.e. an effective amount) in a conventional dosage form such as tablets, capsules, elixirs, suspensions, solutions or the like. They can be administered in mixture with conventional pharmaceutical carriers or excipients, such as, for example, corn starch, calcium stearate, magnesium carbonate, calcium silicate, dicalcium phosphate, talc, lactose, and the like. Moreover, they can be administered in the presence of buffers, or agents used to adjust to isotonicity, and the pharmaceutical dosage forms can, if desired, be subjected to conventional pharmaceutical expedients such as, for example, sterilization.

The following examples are illustrative but not limitative of the invention. Temperatures, unless otherwise stated, are expressed in degrees centigrade.

*Example 1*

In a dry 2-liter, three-necked flask fitted with a stirrer, dropping funnel, and condenser protected by a drying tube, are placed 500 ml. of benzene, 53 g. of sodium carbonate, and 75.5 g. of chloroacetonitrile; with vigorous stirring, a solution of 113 g. of cis-2,6-dimethylpiperidine in 300 ml. of benzene is added over a 10 minute period. The mixture is refluxed with stirring for 8 hours and allowed to stand overnight.

The solid is filtered with suction, pressed, and washed with 100 ml. of benzene. The benzene solution is concentrated by evaporation in vacuo, and the residue is distilled at the water pump to obtain cis-2,6-dimethylpiperidinoacetonitrile boiling at 99–102°/15 mm.

*Example 2*

A dry 2-liter, three-necked flask with stirrer, condenser, and dropping funnel, is thoroughly flushed with dry nitrogen and the nitrogen atmosphere is maintained throughout the reaction. Ether (800 ml.) dried over sodium, and 23.3 g. of lithium aluminum hydride broken into pieces just small enough to fit into the flask (29/42 joint) is added.

With stirring, a solution of 66.2 g. of cis-2,6-dimethylpiperidinoacetonitrile in 200 ml. of dry ether is added over a period of about 45 minutes. The rate of addition should be just rapid enough so that the heat of reaction maintains a gentle reflux. The mixture is stirred and heated under reflux for three hours and then stirred overnight at room temperature.

With vigorous stirring and cooling in an ice bath, water (45 ml.) is cautiously added dropwise over a period of 1 hour. After 15 minutes, ether (300 ml.), which has been saturated with water, is added. After another 15 minutes of stirring, the mixture is filtered. The solid is pressed on the filter and washed with 100 ml. of ether. The combined ether solutions are dried with sodium sulfate and concentrated by evaporation in vacuo. The residue is distilled at the water pump to obtain 2-(cis-2,6-dimethylpiperidino)ethylamine boiling at 83–85°/10 mm.

*Example 3*

A solution of 42.2 g. of 2-(2,6-dimethylpiperidino)ethylamine and 27.6 g. of 2-methyl-2-thiopseudourea sulfate in 370 ml. of water is refluxed overnight. (A gentle stream of nitrogen is passed over the surface of the solution during reflux, in order to sweep the evolved methyl mercaptan through an intermediate empty absorption bottle and into a trap containing 20% sodium hydroxide solution.) The reaction mixture is clarified by filtration through a filter aid ("Hyflo"), and concentrated to about half volume in vacuo. Addition of 700 ml. of acetone brings about crystallization of the crude product which is dissolved in 120 ml. of water, and the solution made strongly acidic by the addition of 3.2 ml. of concentrated sulfuric acid. On dilution with 300 ml. of acetone, [cis-2-(2,6-dimethylpiperidino)ethyl]guanidine hydrogen sulfate as a crystalline product, M.P. 305–306°, is obtained. The cis compound is a preferred embodiment of the instant invention.

*Example 4*

The base was liberated from 12 g. of rac.-trans-2,6-dimethylpiperidine hydrochloride by solution in 20 ml. of water, addition of 10 ml. of 50% sodium hydroxide, and extraction with three 20 ml. portions of benzene. After drying with potassium carbonate and sodium sulfate, the benzene solution was added to a vigorously stirred mixture of 5.76 g. of chloroacetonitrile, 4.05 g. of sodium carbonate, and 30 ml. of benzene. The mixture was refluxed for 8 hours, allowed to stand overnight, filtered, and distilled in vacuo to obtain rac.-trans-2,6-dimethylpiperidinoacetonitrile boiling at 103–106°/14 mm.

*Example 5*

A solution of 5 g. of rac.-trans-2,6-dimethylpiperidinoacetonitrile in 15 ml. of ether was added with stirring to 1.76 g. of lithium aluminum hydride in 75 ml. of ether over a 10 minute period. The reaction was refluxed for 3 hours, and stirred 16 hours at room temperature. Water (3.40 ml.) was added dropwise with cooling in ice, followed by 25 ml. of ether which had been saturated with water. After filtering, the ether solution was dried with sodium sulfate and concentrated in vacuo. The residue was distilled to obtain 2-(rac.-trans-2,6-dimethylpiperidino)ethylamine boiling at 91–92°/13 mm.

*Example 6*

A mixture of 3.38 g. of 2-(rac.-trans-2,6-dimethylpiperidino)ethylamine, 3.01 g. of 2-methyl-2-thiopseudourea sulfate, and 40 ml. of water was refluxed overnight. After cooling and diluting with 80 ml. of acetone, the crude product crystallized. This was dissolved in 10 ml. of water, and strongly acidified with sulfuric acid. On dilution with 20 ml. of acetone, the product [rac.-trans-2-(2,6-dimethylpiperidino)ethyl]guanidine hydrogen sulfate crystallized, M.P. 299–300°.

What is claimed is:
1. A compound selected from the group consisting of [2-(2,6-dimethylpiperidino)ethyl]guanidine and non-toxic acid addition salts thereof.
2. [cis-2-(2,6-dimethylpiperidino)ethyl]guanidine.
3. [Trans-2-(2,6-dimethylpiperidino)ethyl]guanidine.

References Cited by the Examiner

UNITED STATES PATENTS

| | | | |
|---|---|---|---|
| 2,928,829 | 3/1960 | Mull | 260—293 |
| 3,006,913 | 10/1961 | Mull | 260—293 |
| 3,068,235 | 12/1962 | Shapiro et al. | 260—293 |

FOREIGN PATENTS 561,156  9/1932  Germany.

OTHER REFERENCES 611,886, June 1962, Belgium (11 pp. as reported in Chem. Abst., vol. 57: P15076d, 1962 (Aug.).

Heilbron, Dictionary of Org. Compounds, vol. II, page 333, Oxford University Press, New York (1953).

Nukumskaya et al., Zhur Obshchei Kimi, vol. 29, pp. 3272–3276 (1959).

V. M. Tikhonenko et al., Chem. Abst., vol. 57: 2343i–2344 (July 1962).

WALTER A. MODANCE, *Primary Examiner.*

NICHOLAS S. RIZZO, *Examiner.*

R. PRICE, AVROM D. SPEVACK, *Assistant Examiners.*